United States Patent
Carlson et al.

(10) Patent No.: US 10,063,053 B2
(45) Date of Patent: Aug. 28, 2018

(54) PEAK SHAVING USING ENERGY STORAGE

(71) Applicant: SolarCity Corporation, San Mateo, CA (US)

(72) Inventors: Eric Daniel Carlson, San Mateo, CA (US); Nathan Murthy, Missouri City, TX (US)

(73) Assignee: SolarCity Corporation, San Mateo, CA (US)

(*) Notice: Subject to any disclaimer, the term of this patent is extended or adjusted under 35 U.S.C. 154(b) by 366 days.

(21) Appl. No.: 14/802,581

(22) Filed: Jul. 17, 2015

(65) Prior Publication Data
US 2016/0329707 A1 Nov. 10, 2016

Related U.S. Application Data

(60) Provisional application No. 62/156,486, filed on May 4, 2015.

(51) Int. Cl.
*H02J 3/14* (2006.01)
(52) U.S. Cl.
CPC .............. *H02J 3/14* (2013.01); *Y02B 70/3225* (2013.01); *Y04S 20/222* (2013.01)
(58) Field of Classification Search
CPC ........ H02J 2003/003; H02J 3/14; H02J 3/383; Y02B 70/3225; Y02E 10/566; Y04S 10/54; Y04S 20/222
USPC .......................................... 700/295, 276–291
See application file for complete search history.

(56) References Cited

U.S. PATENT DOCUMENTS

| | | | |
|---|---|---|---|
| 2008/0114499 A1* | 5/2008 | Hakim | G06Q 50/06 700/291 |
| 2012/0248873 A1* | 10/2012 | Oudalov | H02J 3/32 307/52 |
| 2013/0030590 A1* | 1/2013 | Prosser | H02J 3/14 700/295 |
| 2013/0193928 A1* | 8/2013 | Prosser | H02J 7/0042 320/130 |
| 2013/0274935 A1* | 10/2013 | Deshpande | H02J 3/28 700/291 |
| 2014/0094979 A1* | 4/2014 | Mansfield | H02J 3/383 700/291 |
| 2014/0266054 A1* | 9/2014 | Faries | H02J 3/32 320/128 |
| 2015/0261239 A1* | 9/2015 | Zhang | G06Q 30/08 700/291 |

* cited by examiner

Primary Examiner — Jason Lin
(74) Attorney, Agent, or Firm — Kilpatrick Townsend & Stockton LLP

(57) ABSTRACT

Methods for controlling an energy storage device to reduce peak power demand at a site are provided. In one embodiment, load data corresponding to a load in a utility grid-connecting energy generation (EG) system is received. The load data may be sampled at a first predetermined interval, and the EG system may include an energy storage device. A load threshold level is received, and a discharge control signal is generated. The discharge control signal may be generated when the measured load is at or above the load threshold level. The control signal may be applied to the measured load for a second predetermined interval that is longer than the first predetermined interval.

20 Claims, 9 Drawing Sheets

PEAK SHAVING USING ENERGY STORAGE

CROSS-REFERENCES TO RELATED APPLICATIONS

This application claims priority to U.S. Provisional Patent Application No. 62/156,486, filed May 4, 2015, titled "Peak Shaving Using Energy Storage" which is hereby incorporated by reference in its entirety for all purposes.

BACKGROUND

Some electric utility customers, most commonly commercial and industrial customers, are billed two separate charges on their electricity service bill: a consumption charge and a peak demand charge. The consumption charge reflects the total amount of energy that the customer uses over the billing period. In contrast, the peak demand charge reflects the highest, or peak, amount of power demanded by the customer within the billing period. In practice, utility companies usually average power demand over recurring "demand intervals" (e.g., every 15 minutes), and then use the highest demand interval average within the billing period to calculate the peak demand charge.

For customers that face a high peak demand charge each billing cycle, it can be economical to install an onsite energy generating (EG) system (e.g., a battery-based EG system) that performs "peak shaving." This means that the EG system discharges energy during intervals of high site load, thereby offsetting energy consumption from the utility grid and reducing, or shaving, the site's peak power demand. Due to the positive impact peak shaving has on lowering energy bills, improvements to methods of peak shaving are desired.

Conventional peak shaving methods for controlling the flow of energy to/from such systems include various features, such as ratcheting, dead band, roll-off and dispatch calculation. Ratcheting is a feature that adapts a control method to a changing load profile by increasing a target peak value when site power demand rises above the target peak value even after an offset from an energy storage system. Dead band is a feature that maintains a buffer above the target peak value where the target peak value is only ratcheted when the site power demand exceeds the current target peak value plus the dead band. Roll-off is a feature that is utilized to increase the life of the energy storage device by adjusting the amount of power that is allowed to be discharged from the energy storage system based on its state of charge (SoC). Dispatch calculation is a feature that builds upon aspects of the previous three concepts. The dispatch calculation feature constantly attempts to lower a power demand value that is based on a historical, rolling window, where the window is based on the utility-defined demand interval.

These existing methods for controlling the flow of energy to/from such systems to achieve peak shaving generally have a number of shortcomings. For instance, some peak shaving methods generate control signals to discharge an energy storage device at the same frequency at which the load level is monitored. Generating the control signal at the same frequency as monitoring the load level causes the energy storage device to frequently alter the discharging amount. Such frequent alteration of the discharging amount decreases the useable life of the energy storage device, i.e., has high "cycling cost," because of the stress on the energy storage device. Furthermore, not only are such peak shaving methods high in cycling cost, but they can be "unstable" given the constantly-changing discharge pattern.

SUMMARY

Methods for controlling an energy storage device to reduce peak power demand at a site are provided. In one embodiment, load levels at the site are monitored at a certain frequency. When the load levels increase above a maintain level, an energy storage device may be utilized to reduce the load level down to the maintain level. A control signal may be utilized to discharge the energy storage device to reduce the load level. The frequency at which the control signal is applied may be longer than the frequency at which the load, energy generation, and battery levels are monitored.

In certain embodiments, a method includes receiving load data corresponding to a load in a utility grid-connected energy generation (EG) system, where the load data is sampled at a first predetermined interval, and wherein the EG system includes an energy storage device. The method includes receiving a load threshold level, and generating, when the measured load is at or above the load threshold level, a discharge control signal to discharge the energy storage device to reduce the load to the load threshold level. The control signal may be applied to the measured load for a second predetermined interval that is longer than the first predetermined interval.

The energy storage device may be discharged by an amount corresponding to a difference between the load in the utility grid connected EG system and the load threshold level. The difference may be determined by the difference between the current load value and the load threshold level.

The method may further include generating, when the measured load is below the load threshold, a charge control signal to charge the energy storage device to increase the load to the load threshold level. The control signal may be applied to the measured load for the first predetermined interval. Generating the charge control signal may be performed during a time period when energy is generated by the EG system.

In embodiments, the control signal discharges the energy storage device according to a forecasted trend. The forecasted trend may cause the discharge control signal to maintain the last known value prior to generating another discharge control signal such that the trend of the discharge control signal is constant across the entire second predetermined interval. The forecasted trend may be determined by referencing historical records of the load data. In further embodiments, the historical records of the load data may be a time period immediately prior to the generating the discharge control signal. The forecasted trend may be determined by referencing a weather forecast indicating the effect of weather on energy generation and energy consumption. Furthermore, the forecasted trend may be determined by business rules that determine the expected load based on building occupancy or building usage.

In some embodiments, the method may further include comparing the load level to a peak threshold amount, where the peak threshold amount is a highest-reached load value, and where the load threshold level is at a calculated difference below the peak threshold amount. The calculated difference may be determined by a capacity of the energy storage device. The method may yet further include increasing the peak threshold level and the load threshold level when the load level is greater than the peak threshold amount. Moreover, the peak threshold level and the load threshold level may be increased by an amount corresponding to the difference between the load threshold level and the peak threshold amount.

In certain embodiments, a system includes a processor configured to receive load data corresponding to a load in a utility grid-connected energy generation (EG) system, where the load data is sampled at a first predetermined interval, and where the EG system includes an energy storage device. The processor may also be configured to set a load threshold level, and generate, when the measured load is at or above the load threshold, a discharge control signal to discharge the energy storage device to reduce the load to the load threshold level, where the control signal is applied to the measured load for a second predetermined interval that is longer than the first predetermined interval.

In embodiments, the energy storage device may be discharged by an amount corresponding to a difference between the load in the utility grid-connected EG system and the load threshold level. Moreover, the difference may be determined between the current load value and the load threshold level.

In certain embodiments, a non-transitory computer readable medium having stored thereon program code executable by a processor, the program code including code that receives load data corresponding to a load in a utility grid-connected energy generation (EG) system, wherein the load data is sampled at a first predetermined interval, and wherein the EG system includes an energy storage device. The program code may include code that sets a load threshold level, and code that generates, when the measured load is at or above the load threshold, a discharge control signal to discharge the energy storage device to reduce the load to the load threshold level, where the control signal is applied to the measured load for a second predetermined interval that is longer than the first predetermined interval.

The energy storage device may be discharged by an amount corresponding to a difference between the load in the utility grid-connected EG system and the load threshold level. The difference may be determined by the difference between the current load value and the load threshold level The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure relates to systems and methods for decreasing peak load levels with low cycling cost by using an energy storage device in an energy generation (EG) system. The energy storage device discharges to offset a site load to decrease the peak amount of power drawn from a utility grid over a predetermined time period, such as an entire day. In embodiments, the frequency at which a discharge control signal is generated to discharge the energy storage device is less than the frequency at which the load levels are monitored. For example, if a load level is monitored at a first frequency, then a control signal for discharging the energy storage device is performed at a second frequency that is lower than the first frequency. Thus, the energy storage device is discharged less often such that cycling cost is minimized. The word "frequency" used herein relates to how often a discharge control signal is generated and how often the load level is monitored within a period of time.

Numerous benefits are achieved using embodiments described herein over conventional techniques. For example, in some embodiments, the energy storage device changes its discharging control signal at a less often rate, thereby decreasing cycling cost. Furthermore, decreasing the cycling cost offsets the site load in a more stable manner, thereby increasing reliability of the EG system.

2. Exemplary System Environment

Figure 1:
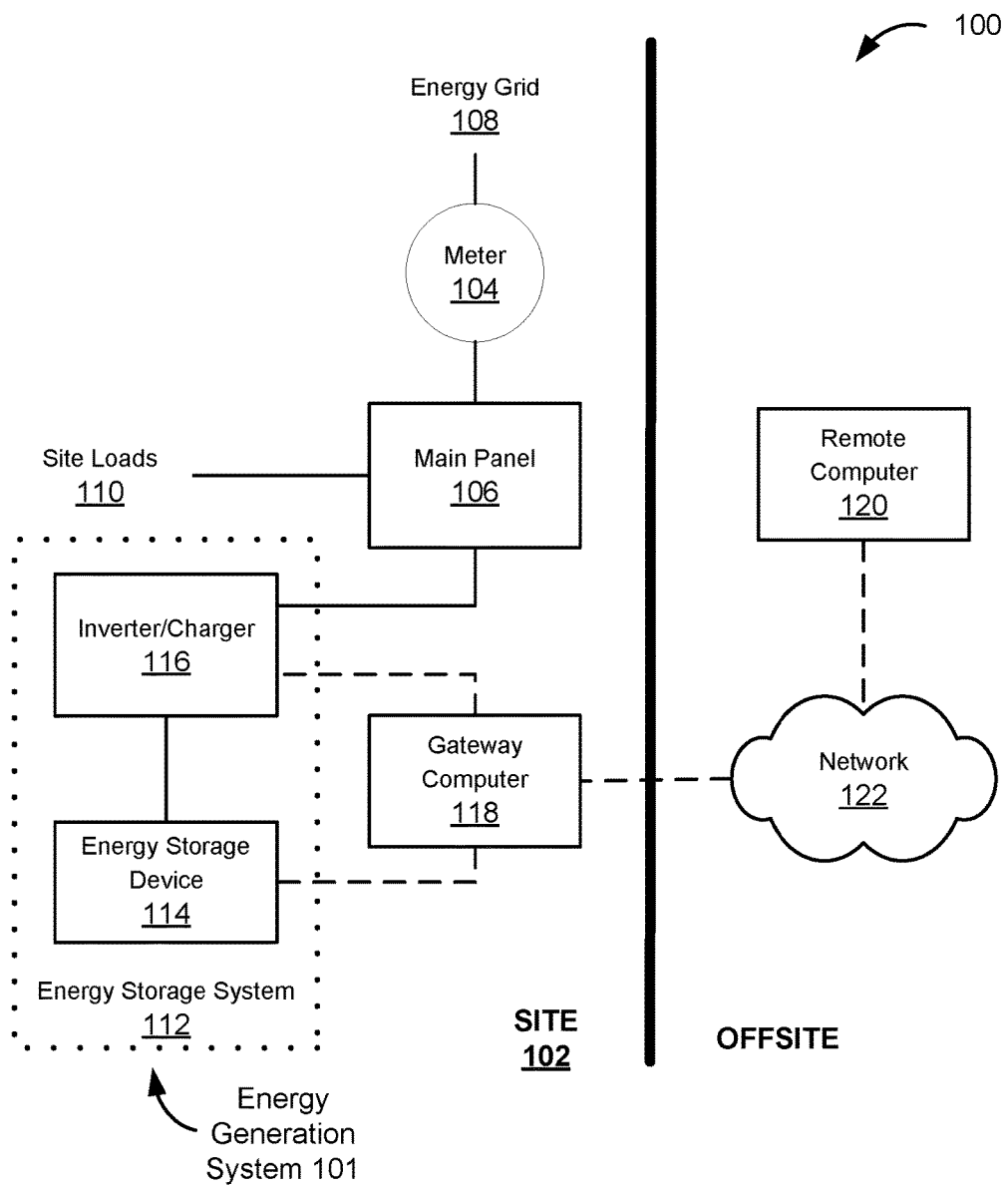
FIG. 1 is a simplified block diagram of a system environment according to embodiments of the present invention.

FIG. 1 depicts a system environment 100 in which embodiments of the present invention may be implemented. As shown, system environment 100 includes a site 102 that comprises infrastructure (e.g., a meter 104 and a main panel 106) for importing energy from a utility-managed energy grid 108. The imported energy can be used to power one or more site loads 110. In one embodiment, meter 104 can be considered a "point of common coupling" (PCC) between energy grid 108 and site 102. The amount of power imported at the PCC at any given time is referred to as the site's instantaneous power demand.

Site 102 also includes an energy storage system 112 comprising an energy storage device 114, e.g., a battery, and an inverter/charger 116. In embodiments, energy storage system 112 can be leveraged to perform peak shaving—in other words, inverter/charger 116 can discharge (i.e., dispatch) stored energy from energy storage device 114 in order to offset site 102's power demand during high demand periods. Furthermore, inverter/charger 116 can use energy that is imported from energy grid 108 to charge energy storage device 114 at times when site loads 110 are relatively low. Through this process, energy storage system 112 can potentially reduce the peak demand power drawn from the grid.

To control its operation, energy storage system 112 can be communicatively coupled with a local controller, such as gateway computer 118. Gateway computer 118 can, among other things, execute one or more peak shaving methods (such as the CV method described herein) to generate control signals for regulating the discharging/charging behavior of inverter/charger 116. Alternatively or in addition, energy storage system 112 can be communicatively coupled with an offsite controller, such as remote computer 120, via a network 122. In these embodiments, remote computer 120 can take over the duties of peak shaving calculation. In a particular embodiment, remote computer 120 can be configured to simultaneously execute peak shaving methods for a fleet of energy storage systems distributed at multiple sites. In embodiments, peak shaving methods may be algorithms that are executable by a processor.

It should be appreciated that system environment 100 is illustrative and not intended to limit embodiments of the present invention. For instance, although energy storage system 112 is depicted as a battery-based system, other types of energy storage technologies (e.g., compressed air, flywheels, pumped hydro, superconducting magnetic energy storage (SMES), etc.) may be used. Further, the various entities depicted in system environment 100 can have other capabilities or include other components/subcomponents that are not specifically described. For example, in certain embodiments, site 102 can include an energy generation system (e.g., a photovoltaic (PV) system) that is coupled with energy storage system 112. One of ordinary skill in the art will recognize many variations, modifications, and alternatives.

3. Peak Shaving

Figure 2A:
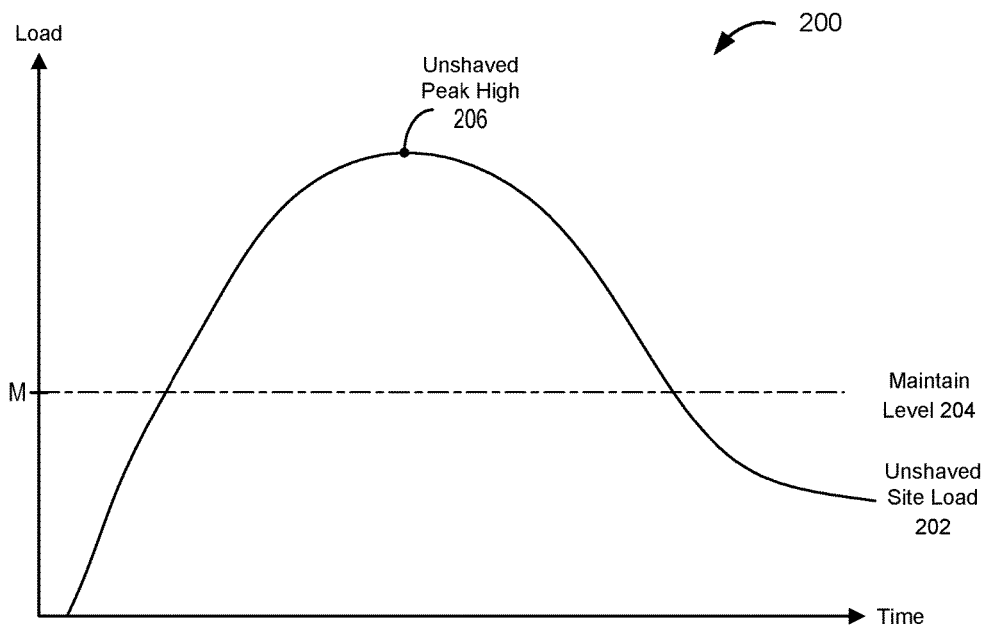
FIG. 2A is a chart plot of an averaged unshaved site load according to embodiments of the present invention.
Figure 2B:
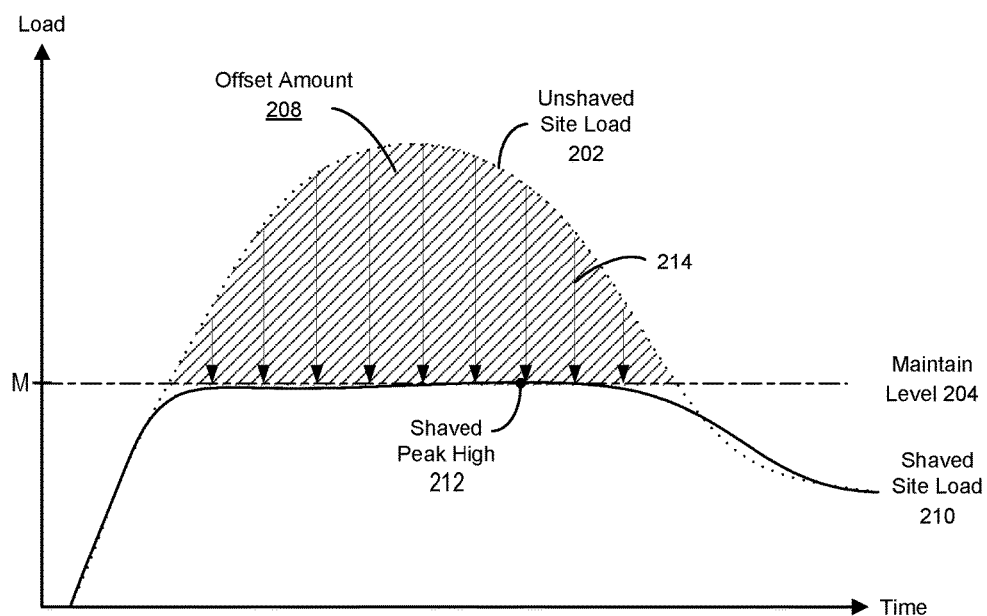
FIG. 2B is a chart plot of an averaged shaved site load according to embodiments of the present invention.

FIGS. 2A and 2B are charts illustrating exemplary load level diagrams for peak shaving of a site load, such as the site load 110, according to embodiments of the present invention. Specifically, FIG. 2A is a chart illustrating an exemplary load level diagram for a utility grid without peak shaving, and FIG. 2B is a chart illustrating the exemplary load level diagram for a utility grid with peak shaving. The Y-axis represents a site's load, e.g. power consumption, and the X-axis represents time. An unshaved site load curve 202 is plotted in the chart 200, and may represent a rolling average of the power demand from a utility grid over a period of time. The rolling average may be a plotted curve where each data point represents an average of several data points. Thus, a plotted rolling average may have a smooth curve profile, such as the curve profile of the unshaved site load 202 shown in FIG. 2A. The unshaved site load curve 202 may include a plurality of plotted load data points that form the profile of the curve 202, where each data point represents an average of five data points. A maintain level 204 may be illustrated to represent a load level at which the energy storage device begins to offset the unshaved site load curve 202. Offsetting the unshaved site load curve 202 decreases the load level of the unshaved site load curve 202 to reduce the peak load.

It is to be appreciated that the unshaved site load curve 202 illustrates the amount of power drawn from a utility grid. Higher load levels equates to more power drawn from the utility grid by the site. Accordingly, higher load levels result in higher power consumption.

As shown in FIG. 2A, the unshaved site load curve 202 may reach an unshaved peak high 206. In such instances, the customer's peak demand charge will be proportionate to the peak high 206. According to embodiments of the present invention, the unshaved peak high 206 may be decreased by applying a peak shaving method to decrease the unshaved peak high 206. For instance, the peak shaving method may discharge an energy storage device at a frequency lower than a frequency at which a load level is sampled to offset peak high 206. In embodiments, the peak high 206 may be decreased by an offset amount 208 to decrease the unshaved peak high 206 to a substantially lower level, such as the maintain level 204 as shown in FIG. 2B.

FIG. 2B illustrates a shaved site load curve 210 when a peak shaving method is applied according to embodiments of the present invention. The unshaved site load curve 202 is illustrated as a dotted line to better illustrate the differences between the unshaved site load curve 202 and the shaved site load curve 210. In embodiments, when the site load is at or above the maintain level 204, a peak shaving method decreases the site load according to embodiments of the present invention. Thus, the shaved site load curve 210 may have a substantially similar curve profile to the unshaved site load curve 202 below the maintain level 204, but a substantially different curve profile above the maintain level 204. For instance, as shown in FIG. 2B, the shaved site load curve 210 may be limited to load levels at or below the maintain level 204 such that the shaved site load curve 210 does not substantially rise above the maintain level 204. Load levels of the unshaved site load 202 may be decreased to the maintain level 204 by an amount shown by the arrows 214 illustrated in FIG. 2A. Accordingly, the shaved site load curve 210 may have a shaved peak high 212 that is substantially lower than the unshaved peak high 206.

In embodiments, an energy storage device may be used to decrease the load levels of the unshaved site load curve 202. For instance, the energy storage device, such as a battery, may discharge to provide power to the site. By discharging battery power to the site, the site would not have to draw as much power from the utility grid. In other words, the power provided by the battery offsets the power drawn from the utility grid. Because, the site draws less power from the utility grid, the load level of the unshaved site load curve 202 may be decreased. In embodiments, the energy storage device is a part of an EG system installed at the site.

By shaving the peak, the customer's peak power consumption for a shaved site load 210 will be substantially lower than the peak power consumption for an unshaved site load 202. According to embodiments of the present invention, peak shaving is a method that maintains site load stability as well as minimizes cycling cost of the energy storage device. The peak shaving method utilizes load data and control signals to discharge an energy storage device to decrease the load level, as will be discussed in more detail herein.

Instantaneous Peak Shaving

Figure 3:
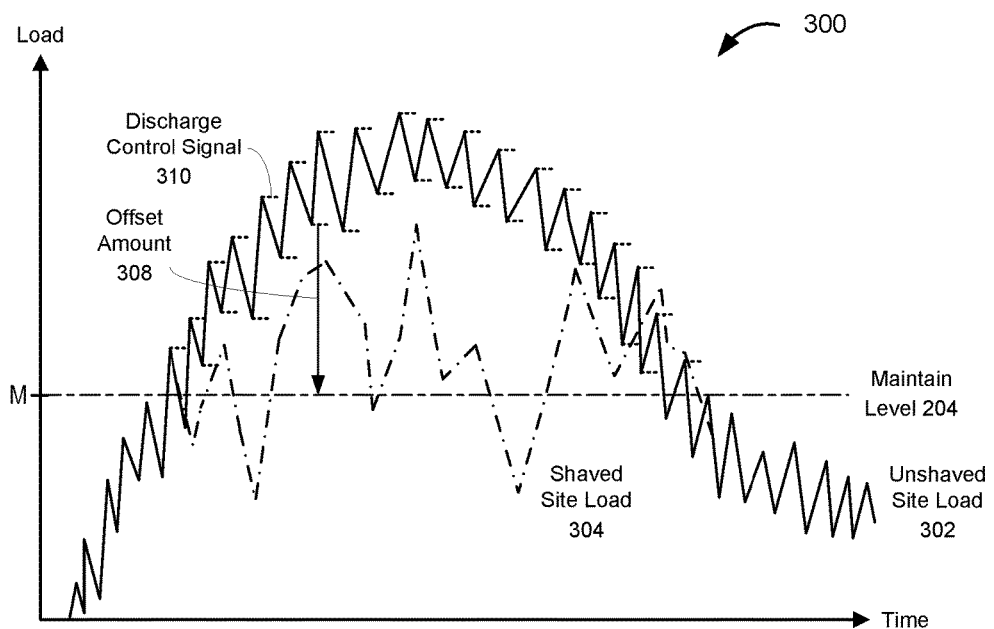
FIG. 3 is a chart plot of an instantaneous, non-averaged unshaved and shaved site load according to conventional methods.

FIG. 3 is a chart 300 illustrating the effects of conventional peak shaving methods on a site load curve, such as the unshaved site load curve 302. The unshaved site load curve 302 may represent an instantaneous power demand over a period of time. The unshaved site load curve 302 may have a jagged profile due to the raw, non-averaged measurement of the site load. As shown in FIG. 3, the point of each jagged profile of the unshaved site load 302 represents a point in time where a sample, i.e., measurement, of the site load was made. If the site load is greater than the maintain level 204, then a discharge control signal 310 is generated to offset the site load by discharging the energy storage device at a corresponding load. As such, the energy storage device may offset the load level down to the maintain level 204. Conventional peak shaving methods sample the site load and generate the control signal simultaneously. That is, the sampling rate of the site load is performed at the same frequency as the generation of the control signal. Accordingly, the generation of the control signal is performed at the sampling rate.

Sampling the site load at a same interval of time as generating the control signal has several shortcomings. For instance, the shaved site load 304 may be unstable. Sampling of the site load may occur at a relatively high frequency. In certain examples, each measurement of the site load may occur in 15 second increments. Generating a control signal to discharge the energy storage device every 15 seconds may not be enough time for the energy storage device to discharge in a stable manner. For instance, a battery that has experienced high cycling stress may have a late response to control signals. In such instances, a new control signal may be generated before the battery could discharge power according to the previous control signal. In other instances, the battery may have less charge capacity. Having less charge capacity may hinder the battery's ability to discharge at a desired power level. Accordingly, the resulting shaved site load 304 may be highly volatile, as shown in FIG. 3. This may result in an insignificant decrease in peak load. Additionally, frequently changing the discharged power is detrimental to the useable life of the energy storage device, e.g., has a high cycling cost. The high cycling cost may cause premature wear of the energy storage device and result in premature failure of the EG system.

Forecasted Peak Shaving

Figure 4:
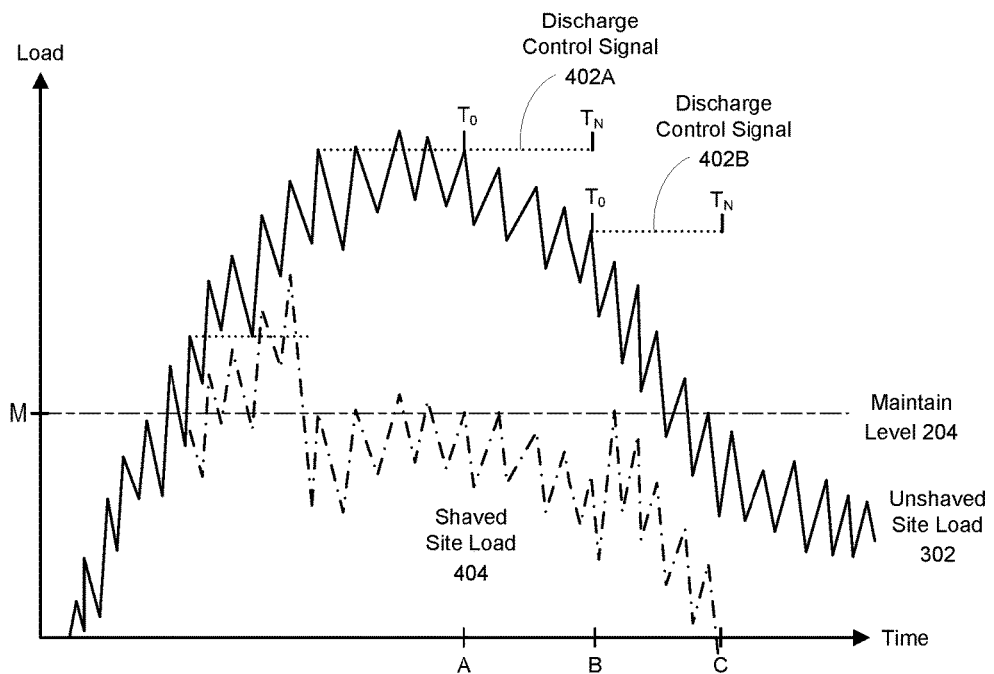
FIG. 4 is a chart plot of an instantaneous, non-averaged unshaved and shaved site load for a forecasted control signal having a constant trend according to embodiments of the present invention.

FIG. 4 illustrates an exemplary peak shaving method according to embodiments of the present invention. Instead of generating the control signal at the sampling rate, the control signal may be generated at a forecasting rate. The forecasting rate may have a frequency that is lower than that of the sampling rate. Accordingly, the forecasting rate may be asynchronous to the sampling rate. In certain embodiments, the forecasting rate may generate the control signal for a predetermined interval that is longer than the predetermined interval of the sampling rate. For instance, the control signal may be generated every 5 minutes while the load level may be sampled every 15 seconds. Because the control signal is generated for a longer predetermined time interval than the sampling rate, the discharge control signal 402 may span across several points of the unshaved site load curve 302.

In embodiments, the discharge control signal may be generated according to a forecasted trend. The forecasted trend may be applied across a certain predetermined time interval spanning between time $T_0$ and $T_N$, where N is a predetermined integer greater than 1 determined by the forecasting rate. A lower forecasting rate has a lower frequency, which results in a larger N. A higher forecasting rate has a higher frequency, which results in a smaller N. In embodiments, N may be five minutes. At every time interval from $T_0$ until $T_N$, the control signal may be generated to discharge the energy storage device at a load corresponding to a measured load of the unshaved site load at $T_0$. Once the control signal is generated at $T_N$, then another control signal may be generated thereafter, likewise starting from $T_0$ and ending at $T_N$. The forecasted trend may be a constant trend, an increasing trend, and/or a decreasing trend.

As shown in FIG. 4, the discharge control signal is generated along a predetermined forecasted trend. The predetermined forecasted trend may be substantially constant such that the discharge control signal has a horizontal profile. In such embodiments, the forecasted trend causes the discharge control signal to maintain the last known value prior to generating another discharge control signal. The last known value may be the sampled load at $T_0$. As an example, discharge control signal 402A may discharge the energy storage device at a load level of 20 kilowatts the entire time between $T_0$ to $T_N$ (e.g., A to B), at which point in time another discharge control signal 402B is generated, which may discharge the energy storage device at a load level of 15 kilowatts across the entire time between $T_0$ and $T_N$ (e.g., B to C). Although only two discharge control signals are discussed in detail, one skilled in the art would understand that such explanations apply to each discharge control signal. Further, FIG. 4 illustrates four discharge control signals, but other embodiments are not so limited. Other embodiments may have more or less than four discharge control signals.

Generating the control signals 402 offsets the unshaved site load 302 to the maintain level 204. According to embodiments of the present invention, the resulting shaved site load 404 may be stable. The stable shaved site load 404 may have a similar profile to that of the unshaved site load 302, instead of the drastically different profile of the unstable shaved site load 304 in FIG. 3. Due to the discharge control signals 402, the resulting shaved site load 404 may be at or near the maintain level 204. Furthermore, due to the longer time interval of the forecasting rate, the energy storage device does not have to change its discharging load as often as the sampling rate. Accordingly, operating peak shaving at the forecasting rate has lower cycling cost.

Figure 5:
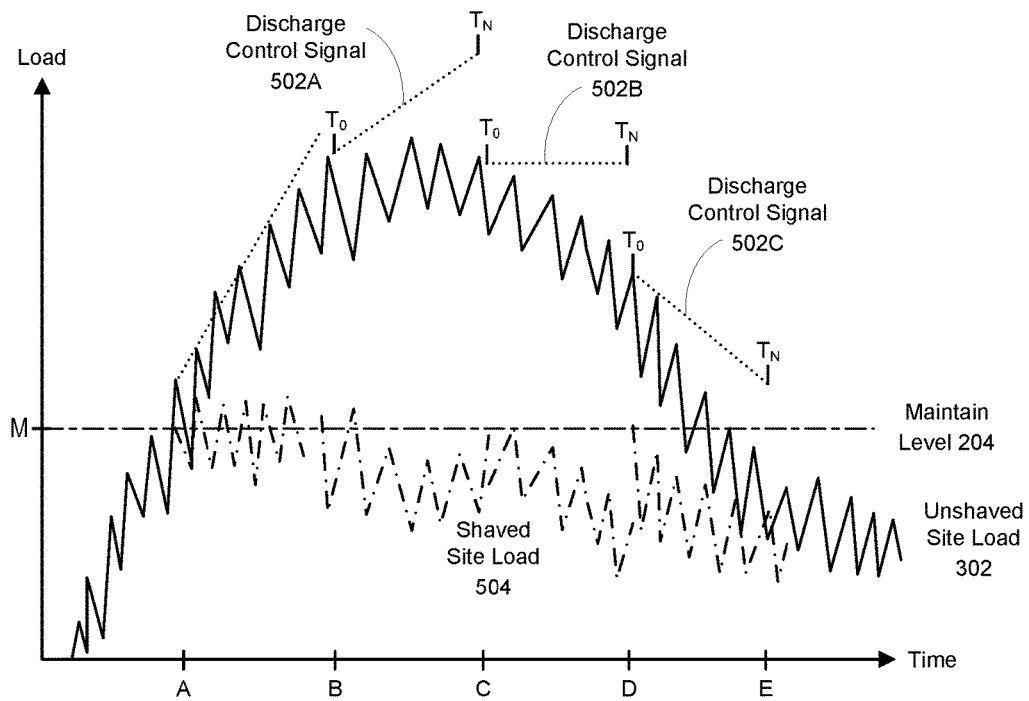
FIG. 5 is a chart plot of an instantaneous, non-averaged unshaved and shaved site load for a forecasted control signal based on an immediate history according to embodiments of the present invention.

FIG. 5 illustrates an exemplary embodiment where the discharge control signal is generated along a forecasted trend that is determined by referencing historical records of the unshaved site load 302. Such a forecasted trend may therefore have constant, increasing, and decreasing trends. The historical records may be load data gathered from the unshaved site load 302 at any point in time prior to the current point in time. For instance, the historical records may be represented by the load data for a period of time immediately before the current point in time (as will be discussed in FIG. 5). In another example, the historical records may be represented by the load data for a period of time in history that overlaps with the current period of time, e.g., the same period of time throughout history (as will be discussed in FIG. 6). It is to be appreciated that any other method that is well known to one of ordinary skill in the art may be used to generate a forecasted trend to offset a peak load according to embodiments of the present invention.

As shown in FIG. 5, the discharge control signal is generated based on historical records from a period of time immediately before the current period of time. The theory of this method is that the period of time immediately prior to the current period of time is a good indication of where the unshaved site load 302 will be projected to follow in the near future. As an example, discharge control signal 502A may have a forecasted trend spanning across time B ($T_0$) to C ($T_N$) that substantially follows the trend of the unshaved site load 302 across time A to B. Accordingly, since the unshaved site load 302 increases between time A to B, the discharge control signal 502A may also increase from $T_0$ to $T_N$. Discharge control signal 502B may have a trend that follows the load data of the unshaved site load 302 between time B to C. Because the unshaved site load 302 stays substantially constant between time B to C, the discharge control signal 502B may also be substantially constant from $T_0$ to $T_N$. Finally, discharge control signal 502C may have a trend that follows the load data of the unshaved site load 302 between time C to D. Since the unshaved site load 302 decreases between time C to D, the discharge control signal 502C may also correspondingly decrease from $T_0$ to $T_N$. It is to be appreciated that the unshaved site load 302 may continue to be sampled while each discharge control signal is generated across $T_0$ to $T_N$. By applying the discharge control signals 502, the shaved site load 504 may be stable and have a load level that is close to, if not below, the maintain level 204.

Figure 6:
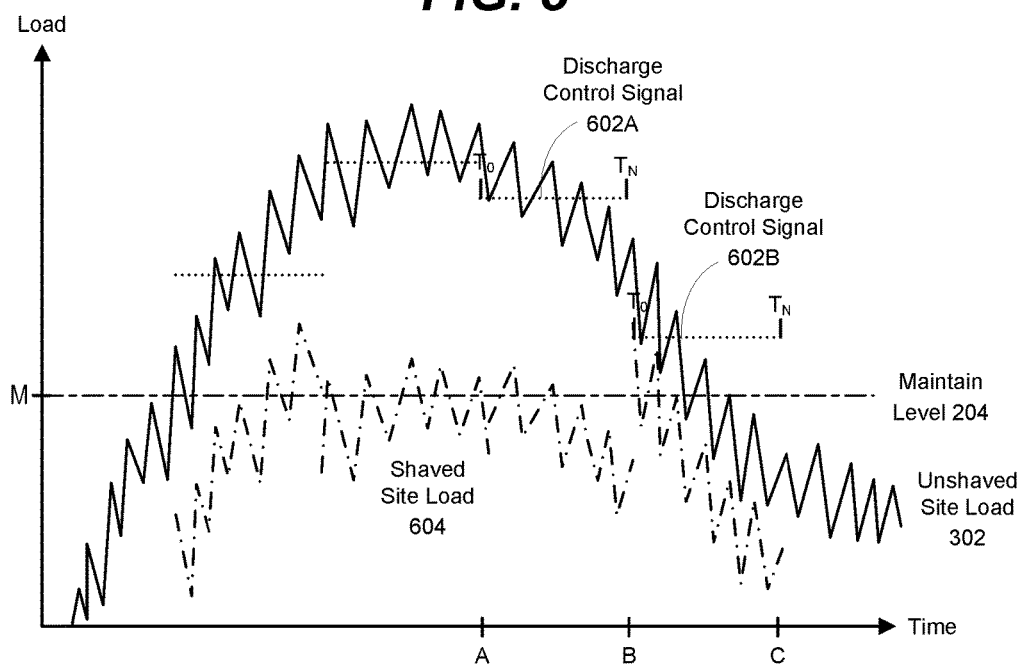
FIG. 6 is a chart plot of an instantaneous, non-averaged unshaved and shaved site load for a forecasted control signal based on an overlapping time from a distant history according to embodiments of the present invention.

FIG. 6 illustrates discharge control signals 602 that are based on historical records for a period of time in history that overlaps with the current period of time. The theory of this method is that the same period of time throughout history is a good indication of where the unshaved site load 302 will be projected to follow. For instance, discharge control signal 602A may have a forecasted trend that is constant, but at a load level that is the average load level of the unshaved site load 302 for the same time period. As an example, if the site load has been around 10 kilowatts every Monday for the past year, then the forecasted trend may generate a control signal to discharge the energy storage device at 10 kilowatts even if the current site load is not 10 kilowatts. Accordingly, the discharge control signal 602A may discharge the energy storage device at a load level that does not correspond to the current sampled site load at time A. Likewise, the following discharge control signal 602B may discharge the energy storage device at a load level that does not correspond to the current sampled site load at time B. Accordingly, the shaved site load 604 may be stable and have a load level that is close to, if not below, the maintain level 204.

In addition to using historical data to generate the control signals, other data sources may be utilized as well. For instance, weather forecast data indicating the effect of weather on energy generation of the EG system may be utilized. If the weather forecast data indicates that there will be substantial overcast, it can be anticipated that the energy storage device may not be sufficiently charged to operate the EG system as a normal, sunny day. Accordingly, the discharge control signal may be automatically decreased by a certain amount to discharge less energy while preserving some peak shaving capabilities of the EG system. Additionally, weather data may be used to forecast the profile of the site load. For example, on an exceptionally hot day, increased air conditioning usage may result in a rising site load profile that is above historic norms.

Business operating rules may also be used to forecast the load profile. Example of business operating rules are store operating hours, times of events at a location such as meetings, delivery of products to stores that require energy for processing such as cold food delivery.

Feedback Loop for Peak Shaving

Figure 7:
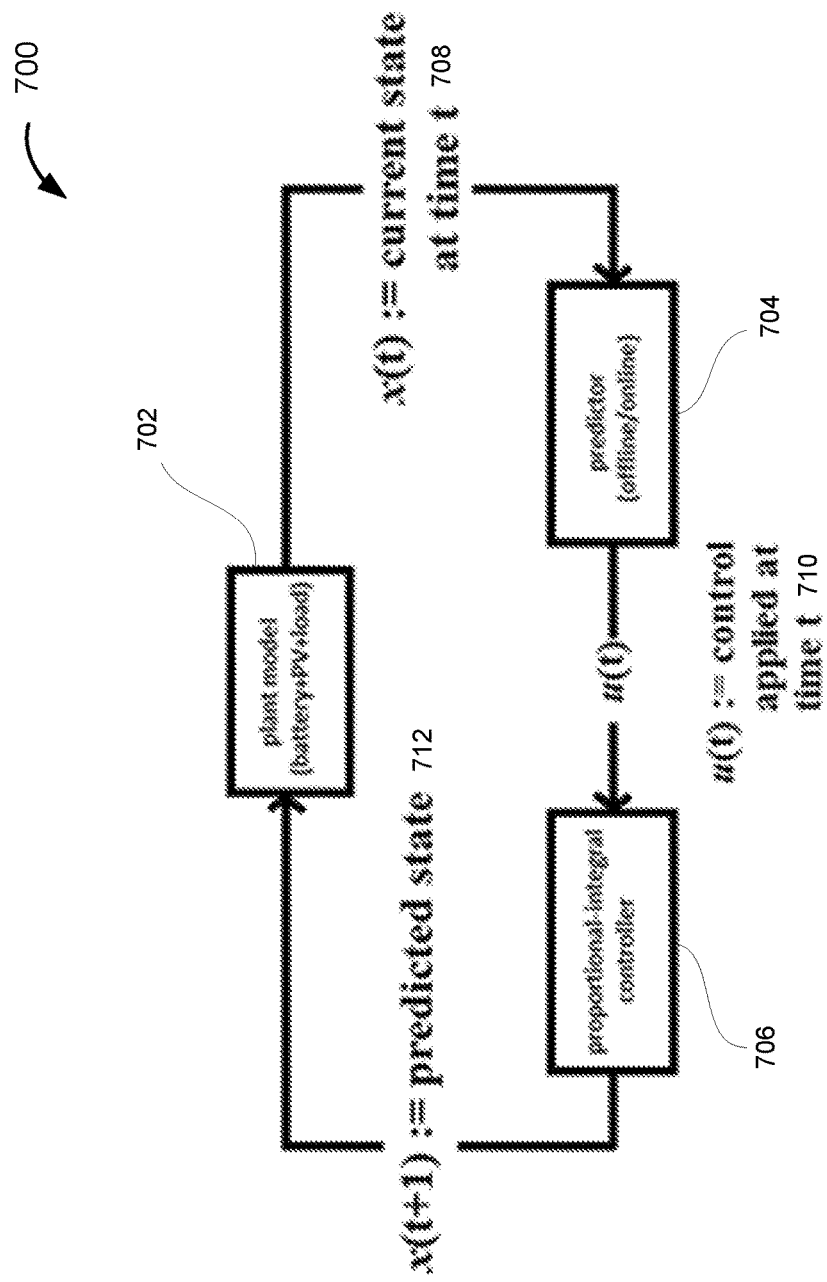
FIG. 7 is a block diagram of a feedback loop system for peak shaving according to embodiments of the present invention.

FIG. 7 is a feedback loop system 700 for a method of peak shaving according to embodiments of the present invention. The feedback loop system 700 may include a predictor 704. Predictor 704 may be a method that determines a discharge control signal, including a forecasting rate and a forecasted trend. The discharge control signal may be represented by a function u(t) that defines the load level, forecasting rate, and forecasted trend of the discharge control signal. The function u(t) may be sent to a proportional-integral controller 706 that implements the function u(t) by generating a series of predicted states. The controller 706 may be formed of any suitable controller capable of generating control signals, such as a central processing unit or a microcontroller. The predicted states may be represented by a series of functions x(t+N), such as x(t+1) 712, where N is an integer defined by the forecasting rate as discussed herein. Each predicted state may perform peak shaving of the site load. As the peak shaving is performed, the predictor 704 may constantly monitor a plant model 702. The plant model 702 may represent the EG system at a current state, which may be represented as a function x(t) 708. The function x(t) of the plant model 702 may be utilized by the predictor 704 to determine the next control signal, i.e., function u(t+1).

Method of Peak Shaving

Figure 8:
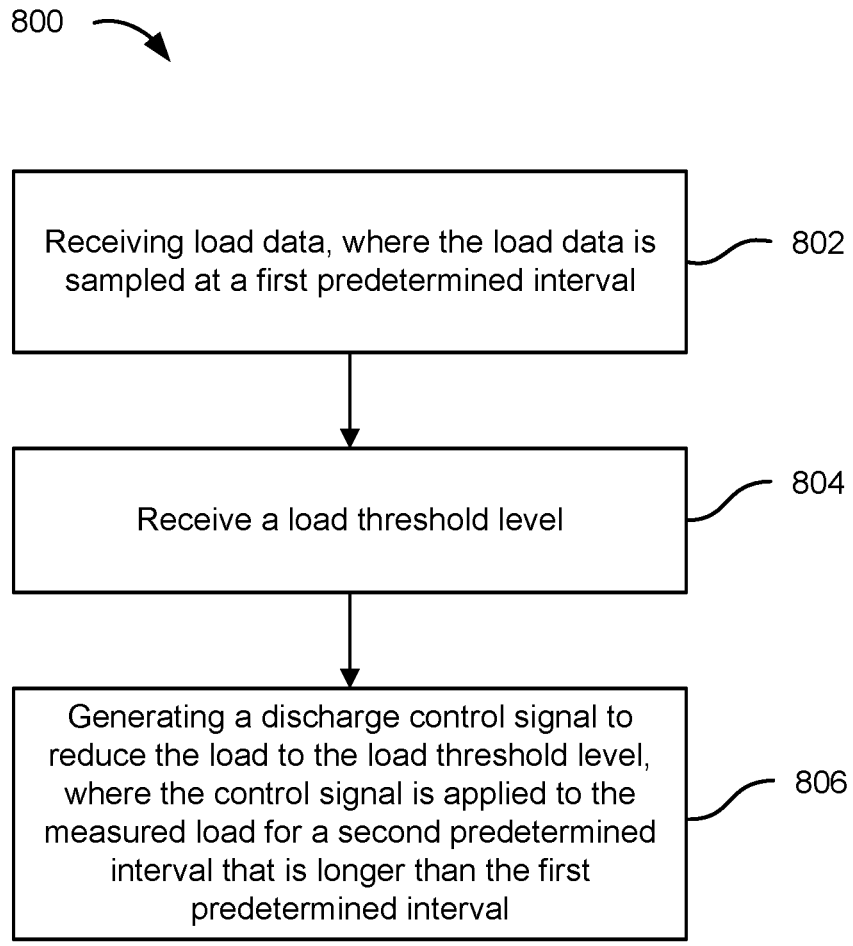
FIG. 8 is a flow chart of a peak shaving method according to embodiments of the present invention.

FIG. 8 is a general flow diagram 800 of a method of peak shaving according to embodiments of the present invention. At block 802, load data may be received. Load data may be data points in a site load curve, such as the site load curve 202 and 302, discussed herein. In embodiments, the load data may be sampled at a first predetermined interval. Furthermore, in embodiments, the load data may be received by a processor. At block 804, a maintain level may be received. The maintain level may be a load threshold level to which a site load may be offset after peak shaving. In certain embodiments, the load threshold level is the maintain level 204 discussed herein. In embodiments, the maintain level is received by the processor.

At block 806, a discharge control signal is generated to reduce the load to the maintain level. In embodiments, the processor may generate the discharge control signal. The control signal may be applied to the measured load for a second predetermined interval that is longer than the first predetermined interval. In embodiments, the discharge control signal is generated according to a forecasting rate and a forecasted trend, as discussed herein with respect to FIGS. 4-6.

Figure 9:
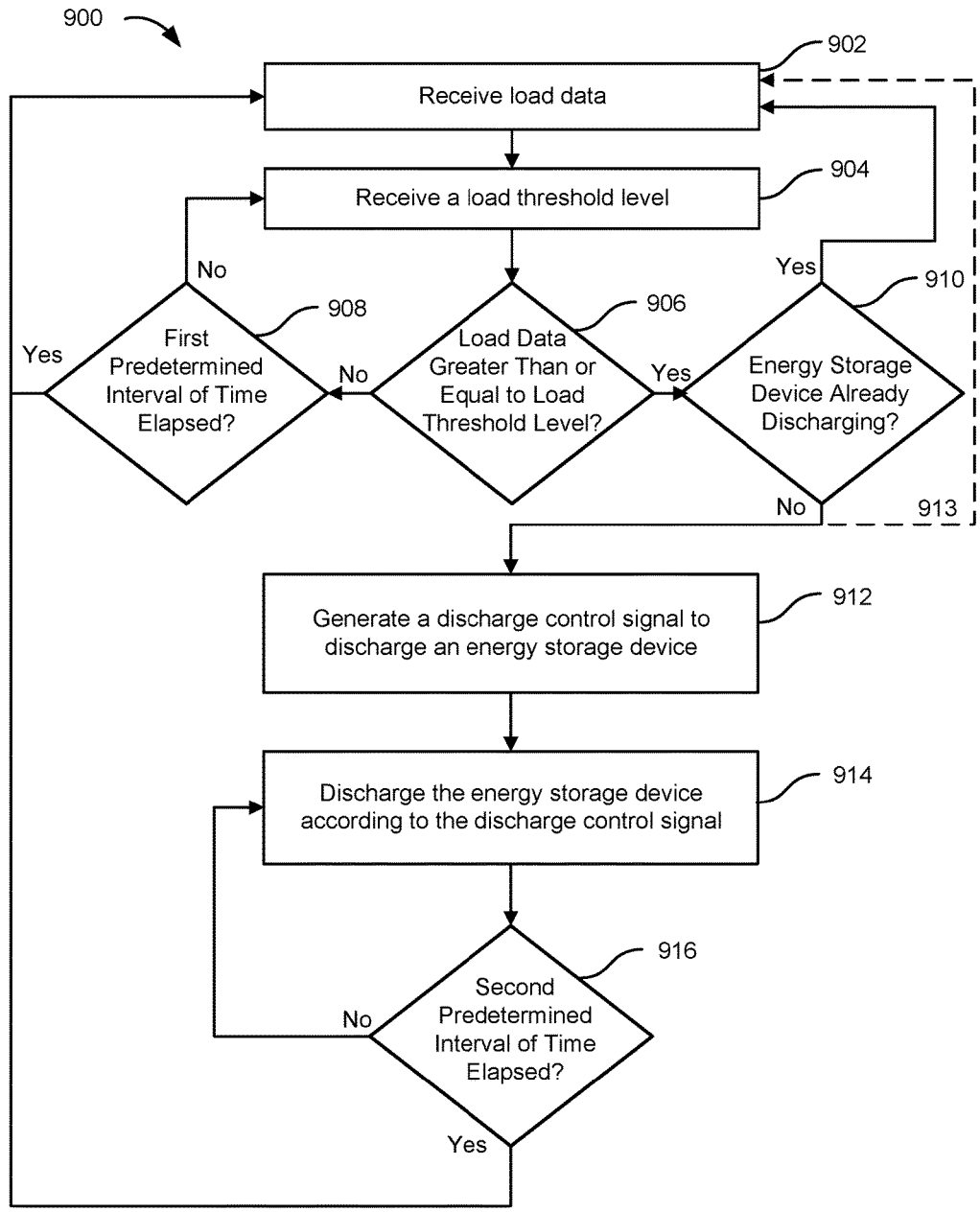
FIG. 9 is a detailed flow chart of a peak shaving method according to embodiments of the present invention.

FIG. 9 is a detailed flow diagram 900 of the method of peak shaving according to certain embodiments of the present invention. At block 902, a load data is received. The load data may be generated by a load meter installed at a site to measure the amount of power drawn from a utility grid. Thus, the load data may represent the current load level drawn by the site from a utility grid. As mentioned herein, the load data may be an instantaneous measured load level or an averaged load level. At block 904, a load threshold level is received. The load threshold level may represent a level of power that, once crossed, initiates discharging of an energy device to offset power drawn from the utility grid. In embodiments, the load threshold level is received by a processor.

Once both the load data and load threshold level are received, then at block 906, the load data is compared to the load threshold level. If the load data is less than the load threshold level, then at block 908 it is determined whether a first predetermined interval of time has elapsed since receiving the load data at block 902. At that point, if the first predetermined time interval has elapsed since receiving the load data, then another load data may be received at block 902, otherwise a new threshold level may be received at block 904.

If the load data is greater than or equal to the load threshold level, then at block 910, it is determined whether the energy storage device is already discharging. If it is determined that the energy storage device is discharging, then a new load data is received at block 902. This allows the energy storage device to discharge for a full period of time (e.g. a second predetermined interval of time such as from $T_0$ to $T_N$).

However, if it is determined that the energy storage device is not discharging, then a discharge control signal is generated at block 912. The discharge control signal may cause a processor to discharge the energy storage device, thereby decreasing (i.e., shaving) the peak load level at the site. In embodiments, the discharge control signal may be generated at time $T_0$, as discussed herein with respect to FIG. 4.

At block 914, the energy storage device is discharged to offset the site load according to the discharge control signal. In embodiments, the energy storage device is discharged in an increasing, decreasing or constant trend (i.e., in a forecasting trend as discussed herein with respect to FIGS. 4-6). For instance, the energy storage device may be discharged at a constant power level, as discussed herein with respect to FIG. 4. Alternatively, the energy storage device may be discharged at an increasing or decreasing power level, as discussed herein with respect to FIGS. 5 and 6.

Such increasing and/or decreasing power levels may be determined by referencing historical records of the load data. The historical records of the load data may be a time period immediately prior to generating the discharge control signal (see FIG. 5), or may be a time period in history that overlaps with the current time period (see FIG. 6). For embodiments where the historical records are a time period immediately prior to generating the discharge control signal, the load data must continually be monitored. Thus, in such embodiments, a new load data may be received even after determining that the energy storage device is not discharging, as indicated by the dotted line 913.

At block 916, it is determined whether a second predetermined interval of time has elapsed since the discharge control signal was generated at time $T_0$. If the second predetermined interval of time has not elapsed since $T_0$, then the energy storage device may continue to be discharged according to the discharge control signal at block 914. In embodiments, blocks 914 and 916 may reiterate N times until the second predetermined interval of time has elapsed at time $T_N$. If the second predetermined interval of time has elapsed since the discharge control signal was generated, then a new load data may be received at block 902. In embodiments, the second predetermined interval of time is greater than the first predetermined interval of time.

It should be appreciated that the specific steps illustrated in FIGS. 8 and 9 provide particular methods 800 and 900 of peak shaving, according to certain embodiments of the present invention. Other sequences of steps may also be performed according to alternative embodiments. For example, alternative embodiments of the present invention may perform the steps outlined above in a different order. Moreover, the individual steps illustrated in FIGS. 8 and 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the methods 800 and 900.

5. Exemplary Scenarios

Figure 10:
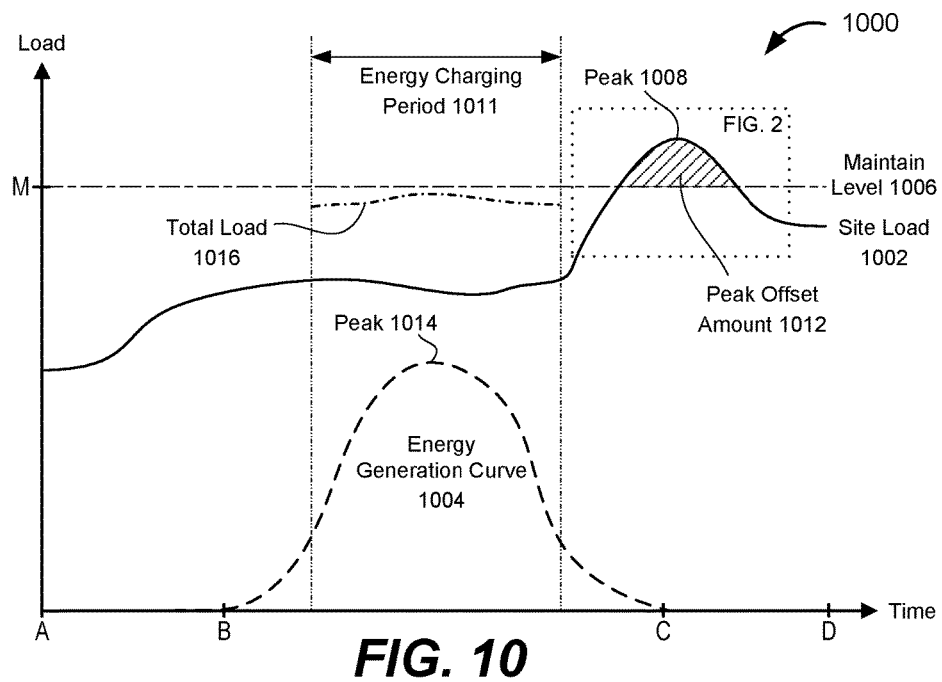
FIG. 10 is a chart plot of an example scenario for a commercial site according to embodiments of the present invention.

FIG. 10 is a chart plot 1000 for an exemplary scenario in which peak shaving is utilized in an EG system according to embodiments discussed herein. The chart 1000 may include superimposed trends of site load 1002 and EG curve 1004 for any suitable site, such as a commercial or industrial site.

The site load 1002 is illustrated as an averaged curve that spans across time A to D. Time A may represent the early hours of a typical day when the commercial site is still closed. Because the commercial site is not open for business, the load may be low. As employees begin to arrive at the commercial site to start their shift, the site load may rise between time periods A and B due to an increasing activity within the commercial site. After the business opens, and during the middle of the day between time periods B and C, the commercial site may draw an elevated but steady load. As the day begins to darken, the site load may begin to substantially increase until peak 1008 due to an increased load caused by providing light to the premises. The site load 1002 may then begin to decrease after the peak 1008 when the business closes.

According to embodiments, peak shaving may be utilized to decrease the peak 1008. As the site load 1002 increases above a maintain level 1006, the peak 1008 may be decreased by discharging an energy storage device to lower the peak 1008 by a peak offset amount 1012, according to embodiments of the present invention. Accordingly, the peak 1008 may be decreased to around the maintain level 1006.

The energy storage device may contain stored energy generated by an EG system. The EG system may be a solar power energy system, for example. In such embodiments, the EG system may store charge into the energy storage device during periods of time when energy can be generated by the EG system. For instance, the EG system may store charge in the energy storage device during an energy charging period 1010 when sunlight is present. The energy charging period 1010 may be determined according to charging efficiency, and/or according to laws and regulations governing the renewable energy generation industry. The energy charging period 1010 may be a period of time that overlaps with the energy generation curve 1004.

Energy generation curve 1004 may represent the amount of energy generated by the EG system during a single day. The energy generation curve 1004 may include one peak surrounded by a relatively flat trend, which may directly correlate with the amount of sunlight produced in a normal, e.g., sunny, day at the commercial site. As an example, there may be little to no sunlight in the very early mornings, followed by the sunrise at time B. Energy generation may then increase to the peak 1014 where energy production is greatest (i.e., in the middle of the day). Thereafter, the energy generation decreases as the sun begins to set until time C where there is no longer any current generation by the EG system due to the setting of the sun. Although the energy generation curve 1004 illustrated in FIG. 10 does not rise above the site load 1002, embodiments are not limited to such circumstances. For instance, site loads in other embodiments may be lower than the peak 1014.

In embodiments, the energy storage device may charge when the site load is below the maintain level 1006. Charging the energy storage device during the day prepares the energy storage device for periods of time when the site load may peak. For instance, the site load may peak at night when the sun has set, and when an increasing amount of electricity is used to operate a business location.

Total Load

According to embodiments of the present invention, the energy storage device charges during the energy charging period 1010. Because the energy storage device is charging, the energy storage device is effectively creating an additional load. The additional load is provided by the EG system as energy is produced by the solar panels. Accordingly, the total load may be higher than the site load during the energy charging period 1010.

In embodiments, the peak shaving method according to embodiments herein is continuously run the entire day, e.g., time A to D. Thus, the method may need to be cognizant of the charging amount and the site load to ensure that the total load does not drastically spike to an unbearable amount if an unexpected peak arises during the energy charging period 1010.

Figure 11:
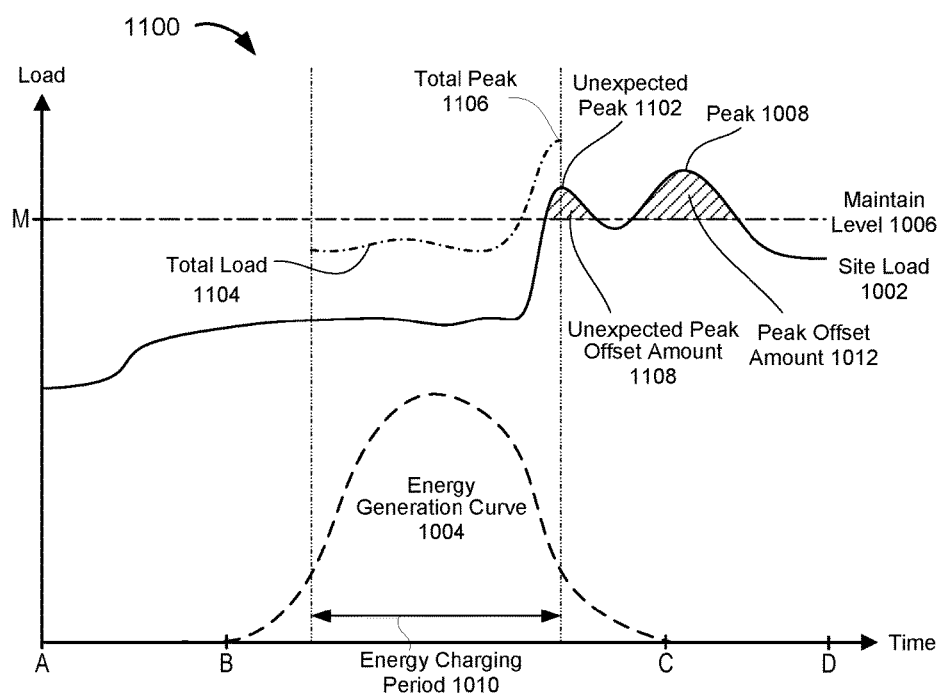
FIG. 11 is a chart plot of an example scenario for a commercial site having an unexpected peak according to embodiments of the present invention.

FIG. 11 is a chart plot 1100 for an exemplary scenario where an unexpected peak 1102 occurs during the energy charging period 1010 in which peak shaving is utilized in an EG system. As shown in FIG. 11, a part of the unexpected peak 1102 may have a load level that is above the maintain level 1006 and within the energy charging period 1010. Accordingly, the peak shaving method according to embodiments discussed herein may generate a control signal to offset the load level disposed above the maintain level 1006. If the method is not cognizant of the load created from charging the energy storage device, a total peak 1106 may be generated that is too high. In such instances, the high total peak 1106 may cause the site load 1002 to peak at a higher level than if there were no EG system at all. Thus, in this case, the EG system would cause the peak demand charge to substantially increase to a high load level, and cause the energy storage device to prematurely deplete its stored charge.

Accordingly, methods discussed herein may determine whether the control signal is being generated during the energy charging period. If so, then the method may monitor the total load and limit charging of the energy storage device to prevent the occurrence of an unbearably high total peak 1106.

6. Exemplary Computer System

Figure 12:
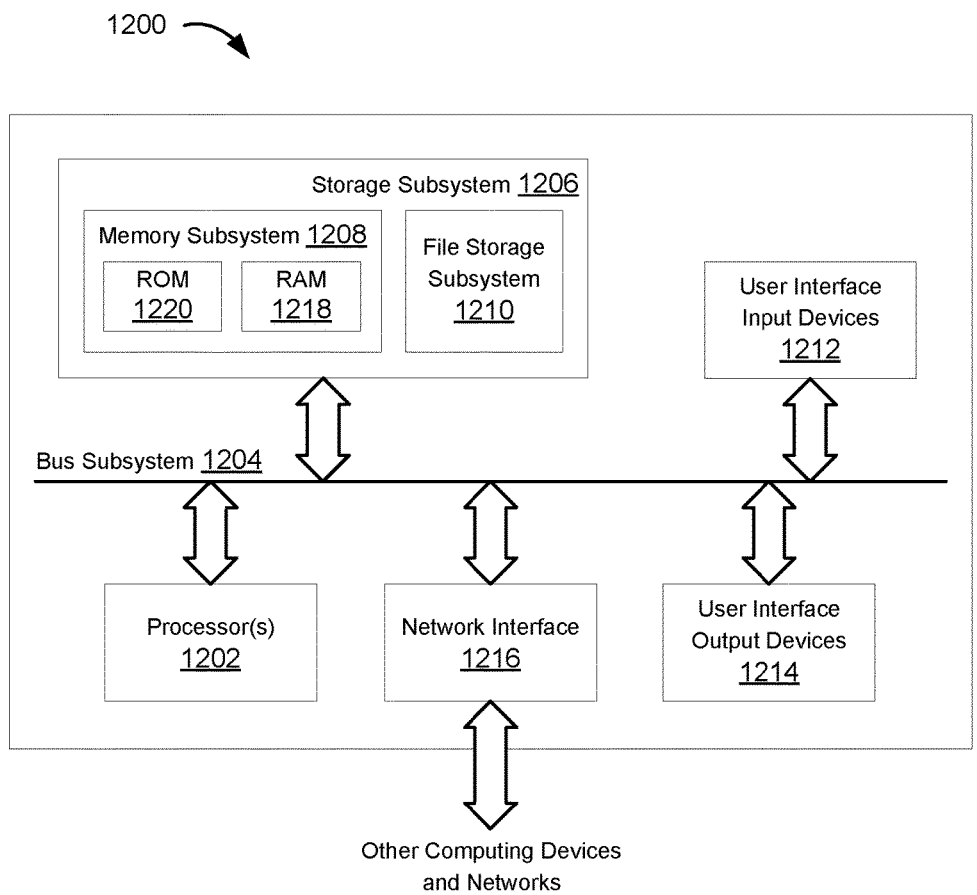
FIG. 12 is a simplified block diagram of a computer system according to an embodiment.

FIG. 12 depicts a computer system 1200 according to an embodiment. Computer system 1200 can be used to implement any of the computer systems/devices (e.g., local gateway computer 118 or remote computer 120) described with respect to FIG. 1. As shown in FIG. 12, computer system 1200 can include one or more processors 1202 that communicate with a number of peripheral devices via a bus subsystem 1204. These peripheral devices can include a storage subsystem 1206 (comprising a memory subsystem 1208 and a file storage subsystem 1210), user interface input devices 1212, user interface output devices 1214, and a network interface subsystem 1216.

Bus subsystem 1204 can provide a mechanism for letting the various components and subsystems of computer system 1200 communicate with each other as intended. Although bus subsystem 1204 is shown schematically as a single bus, alternative embodiments of bus subsystem 1204 can utilize multiple buses.

Network interface subsystem 1216 can serve as an interface for communicating data between computer system 1200 and other computer systems or networks (e.g., network 122 of FIG. 1). Embodiments of network interface subsystem 1216 can include wired interfaces (e.g., Ethernet, CAN, RS232, RS485, etc.) or wireless interfaces (e.g., ZigBee, Wi-Fi, cellular, etc.).

User interface input devices 1212 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1200.

User interface output devices 1214 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1200.

Storage subsystem 1206 can include a memory subsystem 1208 and a file/disk storage subsystem 1210. Subsystems 1208 and 1210 represent non-transitory computer-readable storage media that can store program code and/or data that provide the functionality of embodiments of the present invention.

Memory subsystem 1208 can include a number of memories including a main random access memory (RAM) 1218 for storage of instructions and data during program execution and a read-only memory (ROM) 1220 in which fixed instructions are stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and not intended to limit embodiments of the present invention. Many other configurations having more or fewer components than computer system 1200 are possible.

What is claimed is:

1. A method comprising:
    receiving, at a processor, load data corresponding to a load in a utility grid-connected energy generation (EG) system, wherein the load data is sampled at a sampling rate, and wherein the EG system includes an energy storage device;
    receiving, at the processor, a load threshold level;
    generating, by the processor when the measured load is at or above the load threshold level, a discharge control signal to discharge the energy storage device to reduce the load to the load threshold level, wherein the discharge control signal is applied to the measured load at a forecasting rate having a frequency lower than that of the sampling rate; and
    generating, when the measured load is below the load threshold, a charge control signal to charge the energy storage device to increase the load to the load threshold level, wherein the charge control signal is applied to the measured load for a period of time defined by the forecasting rate.

2. The method of claim 1, wherein the energy storage device is discharged by an amount corresponding to a difference between the load in the utility grid-connected EG system and the load threshold level.

3. The method of claim 2, wherein the difference is determined by the difference between the current load value and the load threshold level.

4. The method of claim 1, wherein generating the charge control signal is performed during a time period when energy is generated by the EG system.

5. The method of claim 1, wherein the discharge control signal discharges the energy storage device according to a forecasted trend.

6. The method of claim 5, wherein the forecasted trend causes the discharge control signal to maintain the last known value prior to generating another discharge control signal such that the trend of the discharge control signal is constant across an entire period of time defined by the forecasting rate.

7. The method of claim 5, wherein the forecasted trend is determined by referencing historical records of the load data.

8. The method of claim 7, wherein the historical records of the load data is a time period immediately prior to the generating the discharge control signal.

9. The method of claim 5, wherein the forecasted trend is determined by referencing a weather forecast indicating the effect of weather on energy generation and energy consumption.

10. The method of claim 1, further comprising comparing the load level to a peak threshold amount, wherein the peak threshold amount is a highest-reached load value, and wherein the load threshold level is at a calculated difference below the peak threshold amount.

11. The method of claim 10, wherein the calculated difference is determined by a capacity of the energy storage device.

12. The method of claim 10, further comprising increasing the peak threshold level and the load threshold level when the load level is greater than the peak threshold amount.

13. The method of claim 12, wherein the peak threshold level and the load threshold level is increased by an amount corresponding to the difference between the load threshold level and the peak threshold amount.

14. A system comprising:
a processor configured to:
receive load data corresponding to a load in a utility grid-connected energy generation (EG) system, wherein the load data is sampled at a sampling rate, and wherein the EG system includes an energy storage device;
set a load threshold level;
generate, when the measured load is at or above the load threshold, a discharge control signal to discharge the energy storage device to reduce the load to the load threshold level, wherein the discharge control signal is applied to the measured load at a forecasting rate having a frequency lower than that of the sampling rate; and
generate, when the measured load is below the load threshold, a charge control signal to charge the energy storage device to increase the load to the load threshold level, wherein the charge control signal is applied to the measured load for a period of time defined by the forecasting rate.

15. The system of claim 14, wherein the energy storage device is discharged by an amount corresponding to a difference between the load in the utility grid-connected EG system and the load threshold level.

16. The system of claim 15, wherein the difference is determined between the current load value and the load threshold level.

17. The system of claim 14, wherein the discharge control signal discharges the energy storage device according to a forecasted trend.

18. A non-transitory computer readable medium having stored thereon program code executable by a processor, the program code comprising:
code that receives load data corresponding to a load in a utility grid-connected energy generation (EG) system, wherein the load data is sampled at a sampling rate, and wherein the EG system includes an energy storage device;
code that sets a load threshold level;
code that generates, when the measured load is at or above the load threshold, a discharge control signal to discharge the energy storage device to reduce the load to the load threshold level, wherein the discharge control signal is applied to the measured load at a forecasting rate having a frequency lower than that of the sampling rate; and
code that generates, when the measured load is below the load threshold, a charge control signal to charge the energy storage device to increase the load to the load threshold level, wherein the charge control signal is applied to the measured load for a period of time defined by the forecasting rate.

19. The non-transitory computer readable medium of claim 18, wherein the energy storage device is discharged by an amount corresponding to a difference between the load in the utility grid-connected EG system and the load threshold level.

20. The non-transitory computer readable medium of claim 19, wherein the difference is determined by the difference between the current load value and the load threshold level.

* * * * *